(12) United States Patent
Wilson et al.

(10) Patent No.: US 7,790,099 B2
(45) Date of Patent: Sep. 7, 2010

(54) PROCESS AND APPARATUS FOR EXTRACTING ZINC

(75) Inventors: David Wilson, Newport (AU); Giuseppe Italiano, Maude (AU)

(73) Assignee: David Wilson Investments Pty. Ltd., Newport (AU)

( * ) Notice: Subject to any disclaimer, the term of this patent is extended or adjusted under 35 U.S.C. 154(b) by 698 days.

(21) Appl. No.: 10/531,649

(22) PCT Filed: Oct. 15, 2003

(86) PCT No.: PCT/AU03/01366

§ 371 (c)(1),
(2), (4) Date: Oct. 11, 2005

(87) PCT Pub. No.: WO2004/035845

PCT Pub. Date: Apr. 29, 2004

(65) Prior Publication Data

US 2006/0123952 A1   Jun. 15, 2006

(30) Foreign Application Priority Data

Oct. 15, 2002   (AU)   .............................. 2002952062

(51) Int. Cl.
*C22B 19/20*   (2006.01)
(52) U.S. Cl. .................................................... 266/148
(58) Field of Classification Search ................... 75/484, 75/658, 659; 266/148
See application file for complete search history.

(56) References Cited

U.S. PATENT DOCUMENTS

| 1,704,029 A | * | 3/1929 | Baily ......................... 266/141 |
| 2,014,873 A | * | 9/1935 | Wildman ...................... 75/488 |
| 2,855,290 A | * | 10/1958 | Horace ........................ 75/434 |
| 3,592,631 A | * | 7/1971 | Cattelain ...................... 75/660 |
| 3,647,417 A | * | 3/1972 | Wetzel et al. ................. 75/479 |
| 4,384,886 A | * | 5/1983 | Stift ............................ 75/487 |
| 4,525,208 A | * | 6/1985 | Yasukawa et al. ............. 75/662 |
| 5,139,567 A | * | 8/1992 | Matsuoka et al. ............. 75/500 |
| 5,843,204 A | * | 12/1998 | Ishikawa et al. .............. 75/414 |
| 6,264,725 B1 | * | 7/2001 | Stockinger et al. ............ 75/504 |
| 6,875,251 B2 | * | 4/2005 | Gordon et al. ............. 75/10.47 |

FOREIGN PATENT DOCUMENTS

| AU | 19-9642254 | 8/1996 |
| AU | 703821 | 8/1996 |
| EP | 0174641 | 3/1986 |
| EP | 0508166 | 11/1992 |
| EP | 0745692 | 12/1996 |
| WO | 9109977 | 7/1991 |
| WO | 0138455 | 5/2001 |

* cited by examiner

*Primary Examiner*—Roy King
*Assistant Examiner*—Tima M McGuthry-Banks
(74) *Attorney, Agent, or Firm*—Dorsey & Whitney, LLP

(57) ABSTRACT

A process and apparatus for extraction of zinc from a material containing one or more iron oxides and zinc oxide which facilitate heating a composite body of the material and a carbonaceous material in a reduction zone. The reduction zone contains a reducing atmosphere at a temperature insufficient to effect melting of the iron in the material but at a temperature and for a time sufficient to form a reductant from the carbonaceous material and to reduce a predetermined amount of the zinc oxide to zinc vapor. The process and apparatus also facilitate collecting the zinc vapor and cooling it to form liquefied or solid zinc.

23 Claims, 4 Drawing Sheets

PROCESS AND APPARATUS FOR EXTRACTING ZINC

FIELD OF THE INVENTION

This invention relates to a process for the extraction of zinc from a zinc containing material, and to an apparatus for carrying out the process. The invention is particularly suitable for the extraction of zinc from material containing one or more iron oxides and zinc oxide, for example electric arc furnace (EAF) dust. The following discussion will focus on extraction of zinc from EAF dust, however it is to be clearly understood that the invention is not limited to such an application. In the application of the invention to EAF dust, iron and lead are also preferably extracted.

BACKGROUND ART

Electric arc furnace (EAF) technology is becoming an increasingly more important means for steel production world-wide. EAF technology, however, suffers from the disadvantage of producing, as a by-product, large quantities of EAF dust. Approximately 15 to 20 kg of EAF dust is formed per tonne of steel, meaning that millions of tonnes of EAF dust are produced annually world-wide. It is considered a toxic waste and its safe disposal is accordingly problematic. In some jurisdictions, landfill or like disposal of EAF dust is prohibited and so there is a significant incentive to process the dust into components able to be recycled or otherwise safely disposed of. Moreover, given that EAF dust includes as major components iron and zinc, and as lesser components lead and other elements of economic significance, it is a potentially valuable resource yet to be adequately commercially exploited. Zinc in particular may be usefully recycled to a variety of uses depending on the purity of the grade able to be extracted.

European patent publication 174641 is directed to the recovery of zinc and iron from EAF dusts. The disclosed process involves pelletising the dust with coke as a solid carbonaceous material, preheating the pellets in a shaft furnace, and thereafter transferring the preheated pellets, with additional reductant, to an induction furnace in which the pellets are melted. Zinc and lead are recovered as vapour from the induction furnace and condensed to crude zinc and lead metal, while pig iron and lead are separated out as molten phases in the induction furnace.

European patent publication 745692 is also concerned with zinc recovery but from a wide variety of dusts including EAF dust. The essential focus is again reduction, vaporisation, and condensation of the zinc or lead, but here there is no pelletisation or separate preheating stage. The treatment furnace is under a substantial vacuum, and the treatment is at around 750° C., i.e. well below the iron melting temperature but sufficient to vaporise the zinc.

In the process disclosed in international patent publication WO 91/09977 zinc vapour is recovered from a melt furnace in which EAF dust is melted in a proportional mixture of the dust, coal as a carbonaceous material reductant, and a slag forming flux agent. The zinc vapour is condensed to form zinc metal.

Australian patent 703821 discloses a process for reducing metal oxide fines and producing metal therefrom in which the fines are pelletised in a composite with a carbonaceous material such as brown coal or peat, preheated in a reducing atmosphere to reduce the metal oxide, and then, in a separate chamber, treating the reduced material to produce a molten metal containing phase. Retort apparatus suitable for carrying out this process is disclosed in international patent publication WO 01/38455.

There is clearly a need for an effective and safe means for dealing with EAF dust which also realizes at least a portion of its potentially extractable value.

SUMMARY OF THE INVENTION

According to the present invention, there is provided a process for extraction of zinc from a material containing one or more iron oxides and zinc oxide, said process including:
- (a) heating a composite body of said material and a carbonaceous material in a reduction zone containing a reducing atmosphere at a temperature insufficient to effect melting of the iron in the material but at a temperature and for a time sufficient to form a reductant from said carbonaceous material and to reduce a predetermined amount of the zinc oxide to zinc vapour; and
- (b) collecting said zinc vapour and cooling it to form liquefied or solid zinc.

Preferably, the process further includes:
- (c) controlling said zinc vapour to substantially prevent or minimise its premature recondensation.

Preferably, the process includes:
- (d) reducing a predetermined amount of said iron oxides;
- (e) further heating the reduced material from which zinc vapour has been collected to a temperature sufficient to effect melting of the iron therein; and
- (f) recovering and cooling the molten iron.

Waste heat and/or heated gases from said further heating are preferably utilised in formation of the zinc vapour.

In an advantageous arrangement, the controlling of the zinc vapour to substantially prevent or minimise its premature recondensation includes providing gas flow in said reduction zone arranged to drive said zinc vapour away from said reduction zone. Preferably, the gas flow in said reduction zone is generally downwardly and said zinc vapour is driven by said gas flow laterally from the reduction zone.

The respective heating steps (a) and (e) are preferably carried out in separate heating chambers.

In an advantageous application of the invention, the material containing one or more iron oxides and zinc oxide is electric arc furnace (EAF) dust, although other zinc containing materials, such as zinc plant residues, may be treated by the process. As previously mentioned, EAF dust is a waste by-product of steel production via EAF technology and results from vaporisation of volatile metals, particularly zinc and lead, which are subsequently oxidised and extracted as a fine dust. EAF dust contains largely a mixture of oxides, composite iron oxides and chlorides and may include a number of different elements, chiefly iron, zinc, calcium, silicon, lead, copper, manganese, chromium and cadmium.

While the present invention is primarily concerned with zinc extraction from zinc containing iron oxide material, it can also extend to extraction of other metals present in the zinc containing material. The oxides of those other metals should be reducible by reductants derived from carbonaceous material. Where the zinc containing material is EAF dust, other metals that may also be extracted include iron, lead and manganese.

The carbonaceous material used in the inventive process preferably has a high surface area and small grain size selected for enhanced chemical reactivity of the reductant.

Preferred carbonaceous materials are finely divided brown coal or peat because of their cellular structure resulting in high chemical reactivity. Using low rank coal or peat instead of higher rank coal is advantageous economically, due to the lower cost of low rank coal or peat. Brown coal or peat also have desirable physical properties, in particular their ability to plasticise under mechanical shear which enables the production of cohesive pellets formed by extrusion. Without wishing to be limited to a particular mechanism of formation, it is believed that shearing causes attritioning of the brown coal or peat particles resulting in conversion of finely dispersed water in the structure to a bulk liquid phase, and polymerisation of phenolic rings present in the brown coal causing the coal or peat to become wet and plastic. Shearing also produces large numbers and areas of freshly cleaved coal surfaces, thereby maximising the physical association of coal/peat particles with metal oxide particles which in turn enhances the rate of the reduction reaction.

Alternatively, the carbonaceous material may comprise a higher rank coal or some other finely divided active carbon source material, such as sawdust. In this case, it may be necessary to add a binder and/or water to the mixture of zinc oxide containing material and carbonaceous material so as to produce a cohesive mass able to be formed into pellets, such as by extrusion.

Preferably, the process further includes forming said composite body by mixing a carbonaceous material with the material containing one or more iron oxides and zinc oxide to produce a cohesive mass, and compacting the cohesive mass to produce the composite body.

Whatever the type of carbonaceous material, it may be necessary to add additional water to the mixture so as to produce the desired consistency of the cohesive mass.

Preferably, the composite body is in the form of a pellet. More preferably, the pellet is formed by extrusion of the cohesive mass.

The relative quantities of the carbonaceous material and zinc oxide containing material will vary depending on the desired end result. The amount of carbonaceous material in the composite body is preferably such that, when combusted in the heating step or steps, the carbonaceous material provides at least sufficient heat for its carbonisation and for reduction of the zinc and iron oxides and, if recovered, lead oxide, in the treated material containing one or more iron oxides and zinc oxide.

Typically, heating step (a) of the inventive process is conducted in a furnace chamber, and the reduction reaction preferably largely takes place at the boiling point of zinc (907° C.).

The vaporisation of zinc enables an effective means of separating zinc from other elements present in the zinc containing material, especially where that material comprises EAF dust. In the latter case, the boiling point of zinc is considerably lower than those of the other metals of interest in the EAF dust, especially iron (3000° C.) and lead (1515°).

In step (b) of the inventive process, zinc vapour produced from the reduction reaction is collected and cooled to form, preferably, zinc metal. Typically, the zinc vapour is directed into a condenser in which the vapour is cooled to form the zinc metal.

EAF dust and brown coal typically contain refractory materials, such as silica, alumina and calcium and magnesium oxides, as well as sulphur. To reduce or remove these impurities, the controlled provision of a fluxing agent, or its precursor, is highly desirable, for forming a basic slag in the further heating step (e) and to encourage desulphurization reactions to occur. If flux is added to the composite, it can be either added separately, preferably in powder form, to the composite body, or, it can be mixed with the zinc and iron oxides containing material and carbonaceous material that form the composite body, such that the composite body subsequently formed is self-fluxing. Alternatively, a flux precursor, such as uncalcined limestone or magnesite, can be added to the mixture. During reduction of the composite body subsequently formed, the flux precursor undergoes calcination to form the flux. In the case of uncalcined limestone, it undergoes calcination to form lime during the reduction step. Adding uncalcined limestone to the composite body is advantageous because uncalcined limestone is less expensive than lime, thus making the composite more economical to produce. The flux or flux precursor may comprise a calcium or magnesium oxide or hydroxide, or a carbonate such as limestone ($CaCO_3$) or magnesite ($MgCO_3$).

Where the zinc oxide containing material includes other elements apart from zinc, the process of the present invention is an effective means of separating zinc from those other elements. In the case of EAF dust, the process of the invention is able to effectively separate zinc from other metals, especially iron and lead.

In the embodiment of the invention dealing with EAF dust, the reductants formed from carbonaceous materials may also reduce other metal oxides, such as iron oxides and lead oxides, in the composite bodies. Such reduction processes, of the zinc, iron and lead, may proceed in accordance with the metal reduction processes disclosed in the aforementioned Australian Patent No. 703821, the entire disclosure of which is incorporated herein by reference. AU 703821 deals particularly with the reduction of iron oxides using reductants formed from carbonaceous material present in composite pellets of the carbonaceous material and the iron oxides, and the carbonaceous material provides fuel for melting of the reduced metals, as well as providing reductant for reducing the metal oxide.

The molten metal phase which may be formed from using EAF dust in the preferred inventive process including step (e) includes metals other than molten iron, such as molten lead which has a relatively lower melting temperature of 327° C. Moreover, because molten lead has a higher density than molten iron, molten lead occupies a lower level in the molten metal bath than molten iron. This feature enables separation of lead from iron, such as by tapping off molten lead via an outlet located below the lead/iron interface.

The invention also provides apparatus for extraction of zinc from a material containing one or more iron oxides and zinc oxides, including:

a first furnace chamber for receiving composite bodies that include said material and a carbonaceous material, which furnace chamber defines a reduction zone in which said composite bodies may be heated at a temperature insufficient to effect melting of the iron in the material but at a temperature and for a time sufficient to form a reductant from said carbonaceous material and to reduce a predetermined amount of the zinc oxide to zinc vapour;

means to collect said zinc vapour from the first furnace chamber; and means to receive said collected zinc vapour for cooling the vapour to form liquefied or solid zinc.

Means is advantageously provided for controlling said zinc vapour to substantially prevent or minimise its premature recondensation.

Preferably, the apparatus further includes:

a second furnace chamber in communication with said first furnace chamber to receive therefrom reduced material from which said zinc vapour has been collected;

heating means for further heating the received material in the second furnace chamber to a temperature sufficient to effect melting of the iron therein; and means to recover and cool the molten iron.

Preferably, the first and second furnace chambers are arranged so that waste heat and/or heated gases from said further heating are utilised in formation of the zinc vapour in the first furnace chamber.

Advantageously, the means for controlling the zinc vapour includes means associated with the first furnace chamber whereby the zinc vapour is driven away from the reduction zone.

The first furnace chamber is preferably heatable to at least a temperature sufficient to convert at least some of the carbonaceous material to a combustible gas and to effect reduction of the zinc oxide to zinc. Also preferably, the chamber includes a heat resistant container for location within the chamber, which container is used for receiving the composite bodies. In such an arrangement, a gas conduit preferably extends from the heat resistant container to a gas burner for heating the furnace. Once the heating means has heated the furnace and mixture of reactants to the required temperature, carbon monoxide and other combustible gases are evolved from the reactants and pass through the gas conduit to the gas burner. The furnace heating means and gas burner may be one and the same, or different features. Once evolution of the combustible gases commences, the gas burner may be lit and the heating means (if a separate feature) turned off. The gas burner can then be used to maintain the furnace temperature at the desired level.

An outlet for zinc vapour is typically provided laterally in a wall of the first furnace chamber so as to comprise or be part of the zinc vapour collecting means, and a zinc condenser is advantageously in communication with the first furnace chamber via the outlet. Zinc vapour produced during the reduction process passes through the outlet and into the condenser where it is collected and cooled to form zinc metal.

The condenser may be any suitable container in communication with the furnace outlet. In operation, the condenser is maintained at a temperature below the boiling point of zinc so that condensation of zinc may occur therein. However, the temperature of the condenser should not be too cool in order to avoid premature solidification of zinc as fine grained metal, which can easily reoxidise upon exposure to air. Preferably, the condenser is maintained at a temperature in the range 400 to 700° C., more preferably between 500 and 600° C. The temperature is preferably controlled by providing adequate insulation of the condensation chamber, allowing the latent heat of condensation of zinc and the heat in the waste gases to provide the desired heat. A "zinc splash condenser" may be employed and comprises, for example, a motorised rotor that splashes liquid zinc droplets into the path of a waste gas.

Alternatively, the temperature of the condenser may be controlled by means of heating means, such as a furnace, preferably a muffle furnace in which the condenser is positioned.

Preferably the condenser is manufactured from a heat and chemically resistant material, such as refractory material, preferably a refractory ceramic. A suitable refractory material is fireclay.

In one embodiment the condenser preferably includes a main condenser chamber having an inlet for receiving zinc vapour positioned above the base of the main condenser chamber such that condensed zinc does not pass back into the furnace chamber. The main condenser chamber may surround a vapour conduit, the open end of which forms the vapour inlet, extending from the outlet from the reduction zone to a region of the condenser above its base.

In one embodiment, the zinc condenser is positioned above the furnace chamber and the vapour conduit extends in a substantially vertical direction from the furnace outlet into an upper region of the condenser chamber. However, preferably the vapour conduit extends in a lateral direction from the furnace outlet into an upper region of the condenser chamber.

Preferably, the second furnace chamber, which serves as a melting unit, is located vertically below the outlet of the first furnace chamber such that the reduced material, e.g. the reduced pellets, is automatically and continuously fed into the second furnace chamber under gravity. The melting unit preferably includes an insulated melting chamber for receiving the reduced pellets. Once in the melting unit, the temperature of the reduced pellets is raised sufficiently to effect melting of the metal (and any slag phase, if present). This may be achieved by simple combustion of the carbonaceous material remaining in the reduced pellets, possibly aided by injection of an oxidising gas through pipes or tuyeres. If necessary, additional fuel may also be added at this time, for example combustible gases and/or solid materials. Preferably, the oxidising gas is preheated, such as by heat exchange with waste gases from the apparatus, and typically comprises air or some other oxygen containing gas.

Advantageously, the temperature increase in the second furnace chamber is augmented by employing an external heating means. Preferably, the external heating means is an electrical heating means, such as an induction heater, resistance heater or a submerged arc. An induction heater is particularly preferred. In the case of an induction heater, the wall of the insulated melting chamber typically accommodates a conductor coil, with the metal to be melted forming the secondary of a transformer. An induction heater can be used alone or in conjunction with the oxidising gas assisted combustion.

In one or more embodiments, the apparatus is advantageously based upon the design of a retort disclosed in the aforementioned international patent publication WO 01/348455, the entire disclosure of which is incorporated herein by reference. In this form, the apparatus includes:

a thermally insulated casing defining the first furnace chamber therein;

one or more columns provided within the first furnace chamber, each column comprising a plurality of vertically orientated, vertically spaced, heat resistant tubes, wherein the cross-sectional area of each tube is smaller than that of an adjacent, lower tube, and wherein the ends of adjacent tubes are arranged so as to provide an annular space therebetween, an inlet through which a combustible charge is fed into the uppermost tube, an outlet from which reacted charge is removed from the lowermost tube; and a fluid conduit for conveying combustible volatiles evolved by heating said charge to a gas burning means for combustion, to thereby provide heat to the first furnace chamber.

The insulated casing is preferably made of steel, more preferably mild steel. The tubes themselves are typically made from a suitable heat and chemical resistant material, such as an alloy, which may contain steel. The distance between the columns of tubes and the shell will vary but should be such as to provide adequate volume for efficient combustion of the heating medium used.

The retort may contain two or more laterally spaced columns, each comprising a succession of vertically spaced tubes, in order to increase the throughput of material treated in the retort.

Preferably the or each column includes three or more vertically orientated, substantially coaxial tubes. These are advantageously vertically spaced from each other such that there is partial overlap between adjacent ends, thereby defining an annular space therebetween. The annular space enables volatiles evolved during heating and/or reaction of the charge to escape therefrom. After the initial start up, combustible volatiles combust at the annuli, thereby providing heat for subsequent reaction of the charge, meaning that the external heating means can be turned down or off.

Preferably each vertical tube is suspended at an end thereof within the retort, allowing free discharge of the charge into the adjacent, lower vertical tube. Moreover free suspension of each tube and the absence of joins between tubes facilitates thermal expansion and contraction of the tubes and reduces failure due to thermal cycling.

The retort is preferably of a structure that defines two or more combustion zones. A first combustion zone is typically located in an upper region of the retort and a second combustion zone is typically located in a lower region of the retort. Preferably the first and second combustion zones are separated by a wall, and together form a unitary body. More preferably, the wall supports one of the vertically orientated tubes which is suspended therefrom. Preferably, the first and second combustion zones each accommodate one or more vertical tubes, such that each combustion zone has an annulus between tubes opening therein. The provision of more than one combustion zone is advantageous in that it enables greater control over the heating process, as will be subsequently discussed in further detail.

BRIEF DESCRIPTION OF THE DRAWINGS

The invention will be further described, by way of example only, with reference to the accompanying drawings, in which.

EMBODIMENTS OF THE INVENTION

Figure 1:
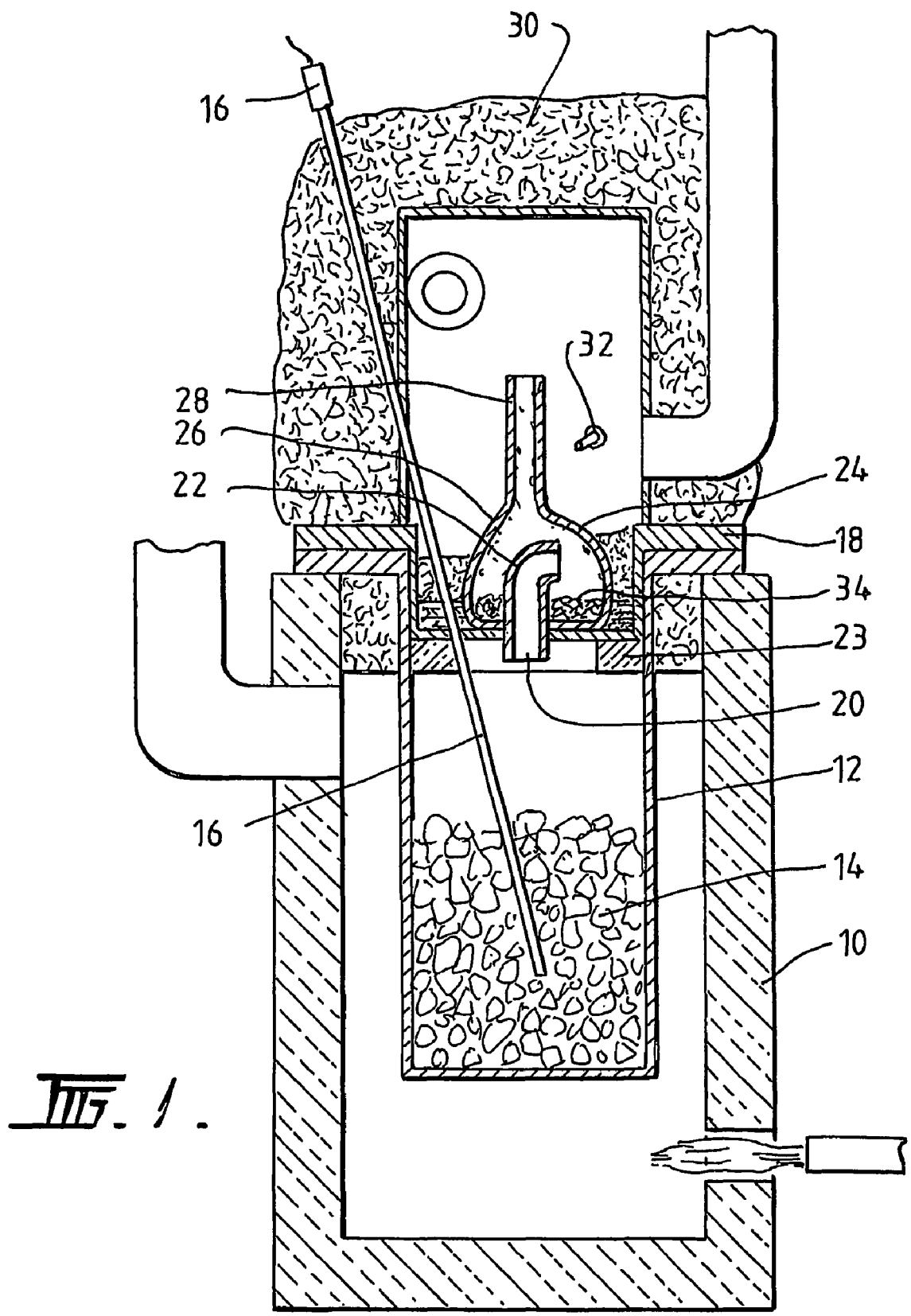
FIG. 1 is a cross-sectional view of a first embodiment of furnace apparatus suitable for carrying out the process of the invention in a batchwise fashion.

One embodiment of apparatus used for carrying out the process of the invention is illustrated in FIG. 1. A first muffle furnace 10 has located therein a stainless steel container 12, acting as a retort, that encloses a furnace chamber in which are placed EAF-brown coal composite pellets 14. A first thermocouple 16 monitors the temperature of the pellets 14 while they are being heated.

The recessed lid 18 of the muffle furnace 10 has an outlet 20 provided centrally therein and a conduit 22 leading from the outlet 20 away from the interior of the muffle furnace 10. Zinc vapour, and other volatiles and gases, are discharged from the first muffle furnace via the outlet and conduit. On the underside of the recessed lid 18 is provided an annular ceramic heat shield 23, the purpose of which is to prevent zinc from condensing on the underside of retort lid 18.

Surrounding the conduit 22 and located within the recessed lid 18 is a zinc condenser 24 comprising a condenser chamber 26 and vertical, integral vent pipe 28, leading away from the condenser chamber 26. The zinc condenser 24 is formed from fireclay, although other refractory materials may instead be used.

Surrounding the zinc condenser 24 and located above the first muffle furnace 10 is a second heating means comprising a second muffle furnace 30. A second thermocouple 32 is provided within the second muffle furnace 30 in order to monitor the interior temperature therein. The purpose of the second muffle furnace is to maintain the temperature of the zinc condenser 24 in the preferred range of 500-600° C., so as to avoid the premature recondensation of zinc as a fine dust and instead allow collection of zinc as a bulk liquid phase. Furthermore, the second muffle furnace 30 serves to burn any coal volatiles and reduction gases emitted from the first furnace before their release.

An example of the use of the apparatus of FIG. 1 will now be described. EAF dust as collected in a bag filter was wetted with a small amount of water and formed into pellets in a disc pelletiser. Pelletisation of EAF dust, while not necessary to the process of the invention, renders the dust easier to handle and store.

The EAF pellets were then mixed with wet brown coal, in equal quantities, plus additional water (if necessary) and subjected to attritioning and extrusion to produce substantially homogeneous pellets. The extruded EAF-brown coal were then dried, either naturally by placing them on trays on covered open racks exposed to ambient air, or by force drying by application of some heat.

Successive batches of EAF-brown coal pellets 14 were heated in the furnace chamber of first muffle furnace 10, which defines a reduction zone, at a temperature insufficient to effect melting of the iron in the pellet material but at a temperature and for a time sufficient to form a reductant from the brown coal and to reduce a predetermined amount of the zinc oxide to zinc vapour. Reduced zinc oxide, in the form of gaseous zinc, was discharged from the pellet charge at temperatures in excess of 907° C., and was observed to exit the first muffle furnace 10 via the outlet 20 in the recessed lid 18. The zinc vapour travelled via conduit 22 into the zinc condenser 24. The zinc vapour condensed into zinc metal, shown as reference numeral 34 in FIG. 1, in the bottom of the condenser chamber 26. Waste gases were discharged into the interior of the second muffle furnace via the vent pipe 28.

Upon completion of the reduction of the pellets 14, the condenser 24 was removed from the second muffle furnace and cooled. The condenser was found to contain a substantial quantity of zinc. The substantially zinc free reduced pellets in the first muffle furnace were transferred to a preheated crucible and a small amount of oxygen was injected. This caused the pellets to melt, and upon cooling they separated into an iron phase and a slag phase.

Samples of the EAF-brown coal pellets, iron slag and zinc phases were analysed and the results are presented in Table 1.

There was virtually no zinc in the iron or the slag. The lead in the zinc represented less than 3% of the lead in the feed pellets. There were no significant amounts of lead in the iron or the slag.

Figure 2:
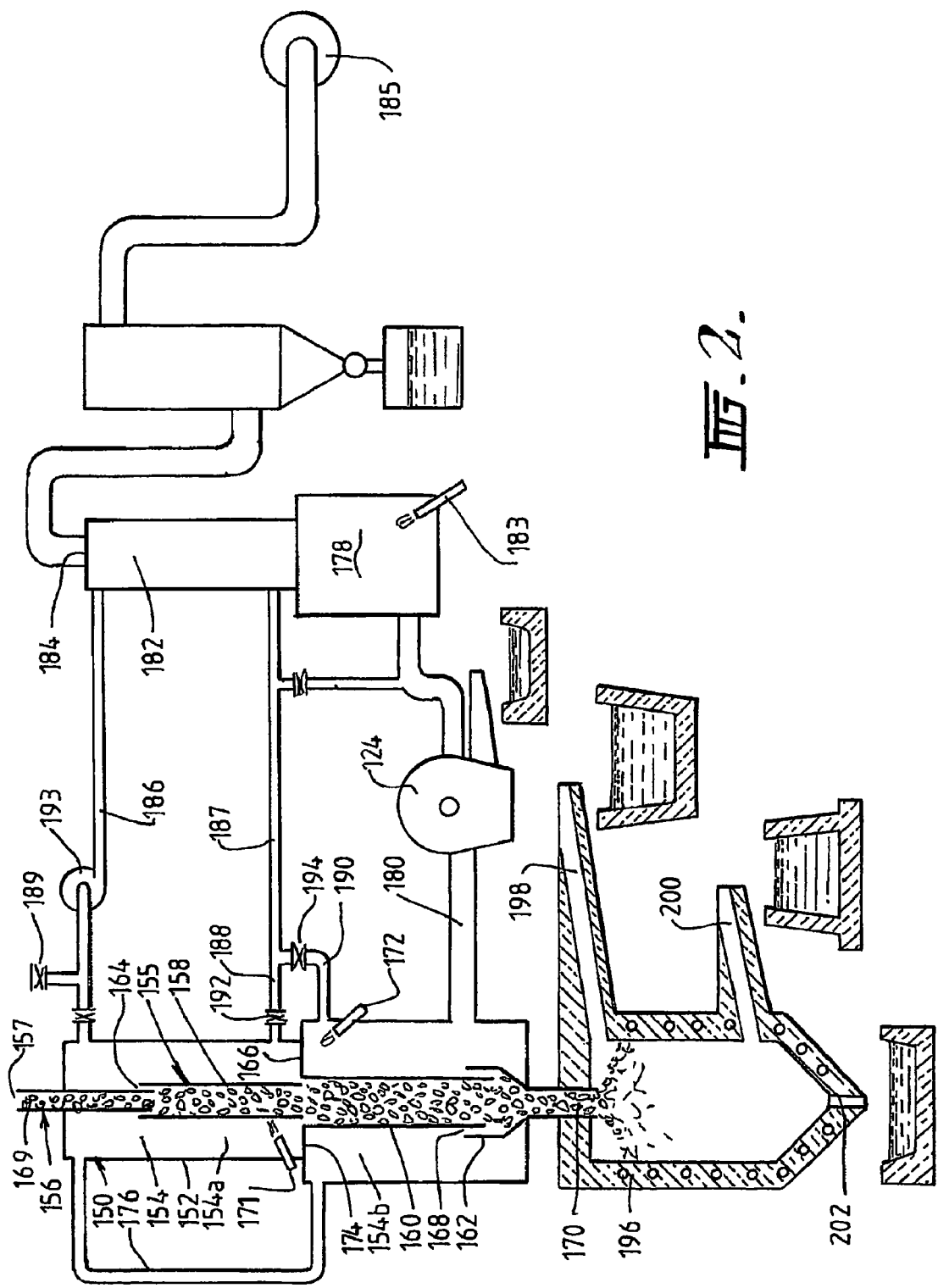
FIG. 2 is a diagrammatic view of a second embodiment of apparatus for carrying out the process of the invention in a continuous flow fashion.

A second embodiment of the apparatus according to the invention is illustrated in FIG. 2. A retort 150 includes a thermally insulated metal shell or casing 152 defining therein an annular first furnace chamber 154. The furnace chamber 154 houses a column 155 of heat resistant tubes 156, 158, 160 and 162 which are vertically orientated and vertically spaced from each other. The cross-sectional area of the tubes 156, 158, 160 and 162 increases from the top of the retort 150 to its bottom. Accordingly, the relative cross-sectional area of the tubes is as follows: tube 156<tube 150<tube 160<tube 162.

The respective ends of adjacent tubes overlap to thereby form open annular spaces 164, 166, 168 therebetween.

The uppermost tube 156 includes an inlet 157 and acts as a feeder tube through which the pellet charge material 169 is fed into the retort 150. The charge moves through the tubes 156, 158, 160 and 162 in succession under the force of gravity. An outlet 170 is provided at the bottom of the lowermost tube 162 through which the reacted charge 169 leaves the retort 150.

The furnace chamber 154 defines a reduction zone and is divided into first and second combustion zones comprising first and second chambers 154a and 154b respectively, by a transverse wall 174. The combustion chambers 154a and 154b each include a heating means comprising a gas burner 171, 172 respectively which provide an initial heat source for raising the temperature of the charge 169. The gas burner 172 in the combustion zone 154b is larger than burner 171 in order to provide sufficient heat for commencement of combustion. Furthermore, the gas burner 172 is located near the top of chamber 154b, whereas gas burner 171 is located near the bottom of chamber 154a.

In the first combustion zone, the temperature of the composite body or pellet charge is raised causing any free water and chemically fixed water to be evolved from the charge. With increasing temperature, low temperature coal volatiles are released (where the carbonaceous material is brown coal), then carbon dioxide is released from any carbonate breakdown. Finally high temperature coal volatiles are released.

In the second combustion zone, the temperature of the charge is raised to a value and for a time sufficient to effect the desired reaction, in the present case, the reduction of metal oxides to metal.

A fluid conduit 176 extends from the top of chamber 154a to the top of chamber 154b. Gases evolved from heating the charge 169 are evolved from open annuli 166 and 164 and travel through the conduit 176 to the chamber 154b, where they are combusted. Because combustion in chamber 154b occurs near the top thereof, combustion gas flow will be in a generally downward direction. Accordingly any zinc vapour produced in chamber 154b is swept downwards by the combustion gas flow and collects at the base of chamber 154b. The zinc vapour then exists chamber 154b by overflowing into conduit 180, located near the base of chamber 154b, and travels to a cooling zone in a zinc condenser 124. The combustion conditions in both chambers 154a and 154b are operated fuel rich so as to maintain a reducing atmosphere in both chambers thereby minimising reoxidation of zinc vapour.

The retort 150 further includes a third combustion chamber 178 communicating with the second combustion chamber 154b via the conduit 180 and the zinc condenser 124. The third combustion chamber 178 in turn communicates with a recuperator 182 through which exhaust gases pass to exhaust outlet 184 under operation of an exhaust fan 185. A gas burner 183 is provided inside the third combustion chamber 178.

The recuperator 182 includes a conduit 186 through which passes atmospheric air admitted through inlet 189 under action of a fan 193, and an outlet 187 through which preheated air exits. In the recuperator 182, the heat from the exhaust gases is transferred to the incoming air to thereby preheat it and the preheated air enters the first and second chambers 154a and 154b via fluid 10 conduits 188 and 190, respectively. Fluid conduit 190 enters chamber 154b near its top where gas burner 172 is located. The amount of air flow into the chambers 154a and 154b can be regulated by dampers 192, 194 respectively.

At the base of retort 150 is provided a metal melting unit comprising an induction heater 196. The reduced pellets are fed under gravity into the induction heater 196 via the retort outlet 170. The induction heater 196 includes an upper, slag outlet 198 and a lower, molten metal outlet 200. The slag outlet 198 is located at an upper region of the induction heater 196 and the metal outlet 200 is located at a lower region. In use, once the reduced charge is melted in the induction heater 196, any slag phase that forms on top of the molten metal phase is tapped off via the slag outlet 198. The molten metal, typically carbon rich iron, is tapped off via molten metal outlet 200. Both the slag and metal outlets 198, 200 can be closed by removable, moist fireclay plugs.

At the base of the induction heater 196 is a second molten metal outlet 202 through which molten lead may be tapped off. Molten lead is denser than molten iron and therefore tends to accumulate towards the base of the induction heater.

Figure 3:
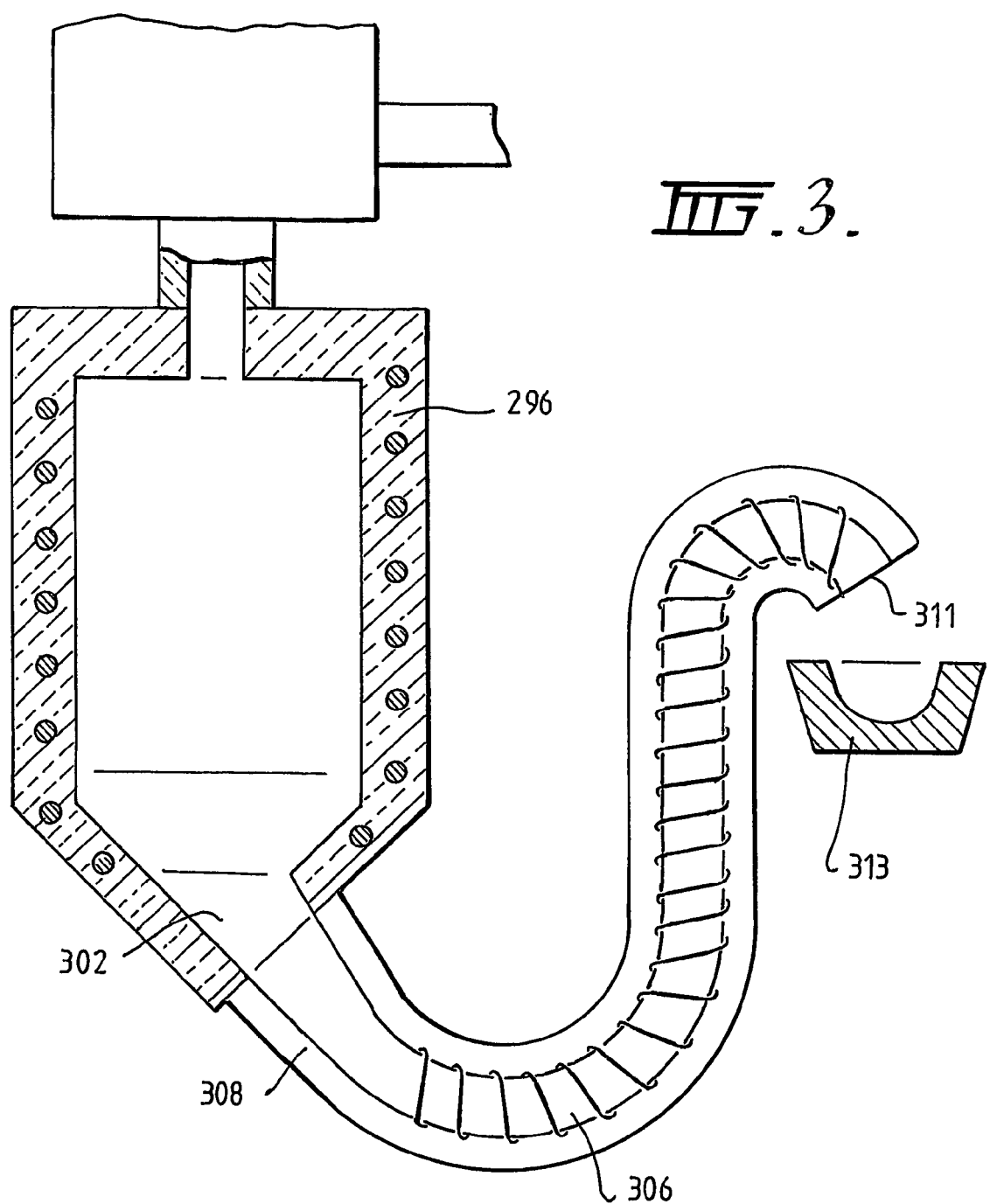
FIG. 3 is a modification of the molten lead outlet in the apparatus illustrated in FIG. 2.

A modification of the second molten metal outlet is shown in FIG. 3. The second molten metal outlet 302 feeds to a heatable conduit 304 comprising an insulated cast iron pipe 306 having electrical heating tape 308 wound therearound. The exit 311 of the cast iron pipe 306 is positioned above the outlet 302 of the induction furnace 296. A lead mould 313 collects the molten lead discharged from the induction heater 296.

The operation of the molten metal outlet 302 will now be described. Prior to the first use, the iron pipe 306 is sealed with a plug of solid lead. When a predetermined amount of molten lead has accumulated in the base of the induction furnace 296 (determined from the mass of pellets reduced) the heating tape 308 is switched on, thereby melting the lead plug therein and enabling molten lead to flow from the induction heater 296 into the heatable conduit 304. Molten lead will flow from the exit 311 into the lead mould 313 until the static head in the pipe 306 balances the static head of molten metal in the induction heater 296. In this manner, the flow of lead can be controlled and discharge of molten iron through the molten metal outlet 302 avoided.

Figure 4:
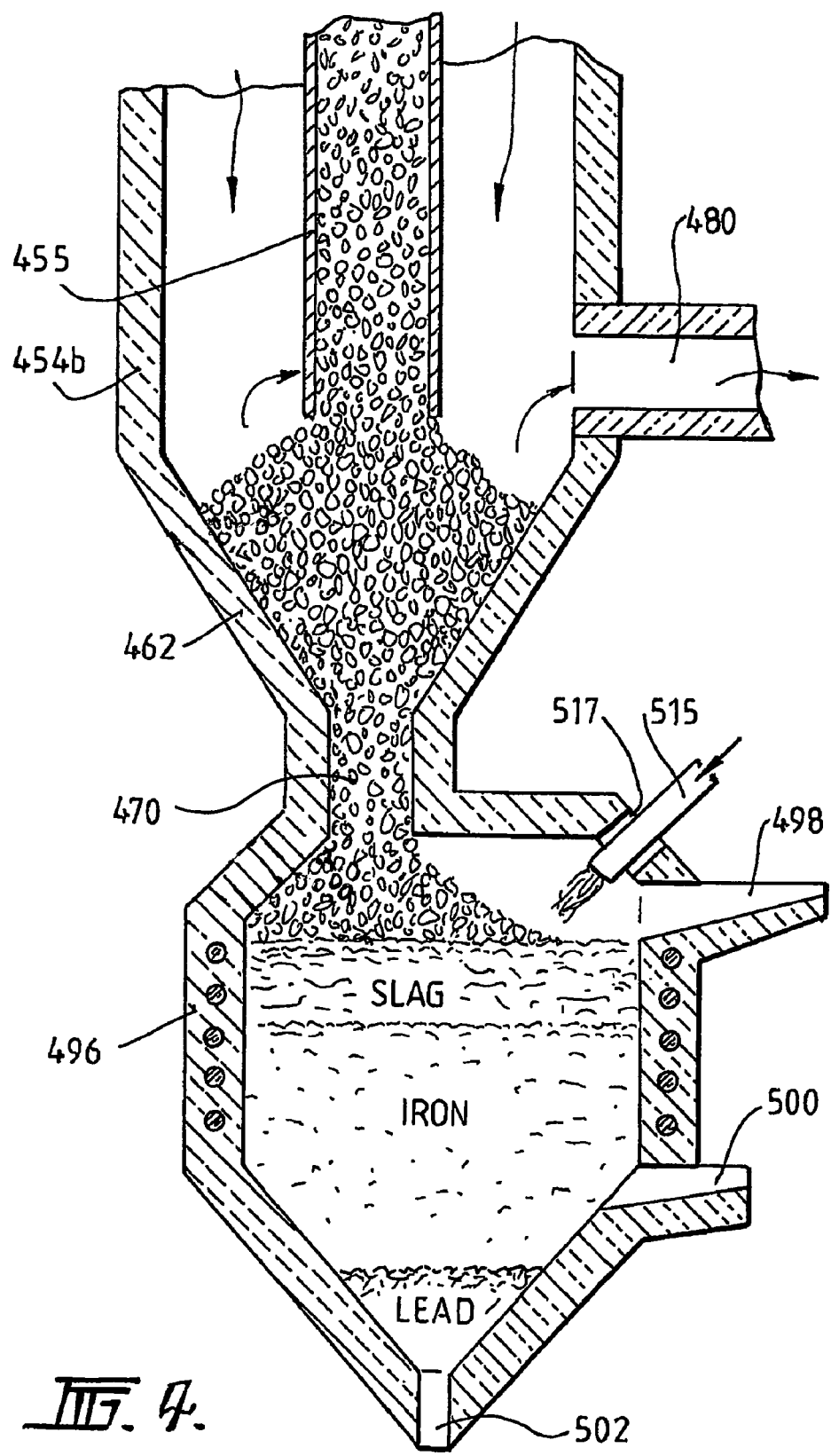
FIG. 4 diagrammatically depicts a modification of the second furnace chamber and associated induction heater.

A modification of the second combustion chamber and induction heater at the base of the retort is illustrated in FIG. 4, in which like reference numerals preceded by a "4" or "5" relate to the corresponding parts of FIG. 2, e.g., column 455, retort outlet 470, slag outlet 498 and molten metal outlets 500, 502. The base of the second combustion chamber 454b is funnel-shaped and in effect forms an integral lowermost tube 462 (the functional equivalent of lowermost tube 162 of FIG. 2). The top of the induction heater 496 has also been modified to receive a gas burner 515 through an opening therein 517. In addition, further fuel, preheated air, flux precursor (e.g. limestone) and/or oxygen may be admitted through the opening 517, in order to produce sufficient hot waste gas for heat transfer. Typically, a temperature of at least 1500.degree. C. will be required in the "melting zone" located towards the top of the induction heater 496, in order to ensure heat transfer sufficient for the "zinc boiling zone", towards the base of the second combustion chamber, to be maintained at a temperature of 907.degree. C. or higher. In this way, waste heat and/or heated gases from the melting zone are utilised in the formation of the zinc vapour. Zinc vapour released from the zinc boiling zone exits the second combustion chamber 454b via a conduit 480 and travels to the zinc condenser (not shown).

Without wishing to be limited to a particular reaction mechanism it is believed that while some of the zinc produced from the reduction reaction exits the reduction zone as zinc vapour, some may re-condense to liquid zinc, with the latent heat of condensation being absorbed by the endothermic reduction reactions. This is clearly problematical because the re-condensed zinc must be boiled off before the temperature of the reduced pellets can be increased, in order to melt the remaining metals in the pellets (and any slag phase, if present). This typically requires that the temperature of the "zinc boiling zone", located above the melting zone of the pellet charge, be maintained sufficiently high to provide the latent heat of vaporisation of zinc. This may be provided either by a separate heating means, or by ensuring that sufficient waste gas flows from the melting zone into the boiling zone, or both.

The required flow of waste gas can be supplied in a number of possible ways, including the following by way of example:
1. Combustion of excess carbon in the reduced pellets with air to form carbon monoxide and nitrogen.
2. Combustion of solid, liquid or gaseous fuel with air to form carbon monoxide, water vapour and nitrogen.
3. Injection of flux precursors (e.g. limestone) into the melting zone. Carbon dioxide from calcination of the flux precursor then reacts with excess carbon from the reduced pellets and/or added fuel to form carbon monoxide.
4. Injection of inert gas.
5. A combination of two or more of the above.

It is highly desirable that no free oxygen is allowed to enter the zinc boiling zone as reoxidation of zinc can occur.

The invention claimed is:

1. Apparatus for extraction of zinc and lead from a material containing one or more iron oxides, zinc oxide and lead oxide, comprising:
   a first furnace chamber for receiving composite bodies that include said material and a carbonaceous material, wherein the first furnace chamber defines a reduction zone in which said composite bodies may be heated at a temperature insufficient to effect melting of the iron in the material but at a temperature and for a time sufficient to form a reductant from said carbonaceous material and to reduce a predetermined amount of the zinc oxide to zinc vapour, and reduce predetermined amounts of said iron oxides and lead oxides to iron and lead, respectively;
   a first arrangement comprising an outlet from the first furnace chamber which is structured to collect said zinc vapour from the first furnace chamber by flow of the zinc vapour into the outlet;
   a second arrangement comprising a condensing arrangement in communication with said outlet and structured to receive said collected zinc vapour and to cool the vapour therein to form liquefied or solid zinc;
   a second furnace chamber in communication with said first furnace chamber to receive therefrom material remaining after said zinc vapour has been collected from the first furnace chamber;
   a heating arrangement configured to further heat the remaining material in the second furnace chamber to a temperature sufficient to effect melting of the iron and lead therein;
   a third arrangement configured to separately recover the molten iron and separately recover the molten lead therefrom;
   a thermally insulated casing defining said first furnace chamber therein;
   one or more columns provided within said first furnace chamber, each column comprising a plurality of vertically orientated, vertically spaced, heat resistant tubes, wherein the cross-sectional area of each tube is smaller than that of an adjacent, lower tube, and wherein the ends of adjacent tubes are arranged so as to provide an annular space therebetween;
   an inlet through which a combustible charge is fed into the uppermost tube;
   an outlet from which reacted charge is removed from the lowermost tube; and
   a fluid conduit for conveying combustible volatiles evolved by heating said charge to a gas burning means for combustion, to thereby provide heat to said first furnace chamber.

2. Apparatus according to claim 1, further comprising a fourth arrangement configured to control said zinc vapour to substantially prevent or minimise its premature recondensation.

3. Apparatus according to claim 2, wherein said fourth arrangement includes a further arrangement associated with said first furnace chamber whereby said zinc vapour is driven away from said reduction zone.

4. Apparatus according to claim 3, wherein said gas flow in said reduction zone is provided generally downwardly and said zinc vapour is driven by said gas flow laterally for the reduction zone.

5. Apparatus according to claim 1, wherein said first and second furnace chambers are arranged so that waste heat and/or heated gases from said further heating are utilised in formation of said zinc vapour in the first furnace chamber.

6. Apparatus according to claim 2, further comprising:
   a fifth arrangement configured to tap slag from said second furnace chamber.

7. Apparatus according to claim 1, wherein said third arrangement is configured to tap molten lead from said second furnace chamber.

8. Apparatus according to claim 1, wherein said second furnace chamber is vertically below the first furnace chamber such that said reduced material is continuously fed into the second furnace chamber under gravity.

9. Apparatus according to claim 1, wherein said heating arrangement is an external electrical heating arrangement.

10. Apparatus according to claim 1, wherein said first furnace chamber defining a cooling zone comprises a zinc vapour condenser in communication with an outlet from said reducing zone comprising a zinc vapour collecting arrangement.

11. Apparatus according to claim 10, wherein said condenser includes a zinc splash condenser.

12. Apparatus according to claim 10, wherein said condenser includes a main condenser chamber having an inlet for receiving zinc vapour positioned above the base of the main condenser chamber such that condensed zinc does not pass back into the furnace chamber.

13. Apparatus according to claim 10, wherein said main condenser chamber surrounds a vapour conduit, the open end of which forms the vapour inlet, extending from said outlet from the reduction zone to a region of the condenser above its base.

14. Apparatus according to claim 10, wherein a vapour conduit extends in a lateral direction from the furnace outlet into an upper region of the condenser chamber.

15. Apparatus for extraction of zinc from a material containing one or more iron oxides and zinc oxide, comprising:
   a first furnace chamber for receiving composite bodies that include said material and a carbonaceous material, wherein the first furnace chamber defines a reduction zone in which said composite bodies may be heated at a temperature insufficient to effect melting of the iron in the material but at a temperature and for a time sufficient to form a reductant from said carbonaceous material and to reduce a predetermined amount of the zinc oxide to zinc vapour;

a first arrangement configured to collect said zinc vapour from the first furnace chamber;

a second arrangement configured to receive said collected zinc vapour for cooling the vapour to form liquefied or solid zinc;

a thermally insulated casing defining said first furnace chamber therein;

one or more columns provided within said first furnace chamber, each column comprising a plurality of vertically orientated, vertically spaced, heat resistant tubes, wherein the cross-sectional area of each tube is smaller than that of an adjacent, lower tube, and wherein the ends of adjacent tubes are arranged so as to provide an annular space therebetween;

an inlet through which a combustible charge is fed into the uppermost tube;

an outlet from which reacted charge is removed from the lowermost tube; and a fluid conduit for conveying combustible volatiles evolved by heating said charge to a gas burning means for combustion, to thereby provide heat to said first furnace chamber.

16. Apparatus according to claim 15, further comprising a third arrangement configured to control said zinc vapour to substantially prevent or minimize its premature recondensation.

17. Apparatus according to claim 16, wherein said third arrangement includes a further arrangement associated with said first furnace chamber whereby said zinc vapour is driven away from said reduction zone.

18. Apparatus according to claim 17, wherein said gas flow in said reduction zone is provided generally downwardly and said zinc vapour is driven by said gas flow laterally for the reduction zone.

19. Apparatus according to claim 15, wherein said first furnace chamber defining a cooling zone comprises a zinc vapour condenser in communication with an outlet from said reducing zone comprising a zinc vapour collecting arrangement.

20. Apparatus according to claim 19, wherein said condenser includes a zinc splash condenser.

21. Apparatus according to claim 19, wherein said condenser includes a main condenser chamber having an inlet for receiving zinc vapour positioned above the base of the main condenser chamber such that condensed zinc does not pass back into the furnace chamber.

22. Apparatus according to claim 19, wherein said main condenser chamber surrounds a vapour conduit, the open end of which forms the vapour inlet, extending from said outlet from the reduction zone to a region of the condenser above its base.

23. Apparatus according to claim 19, wherein a vapour conduit extends in a lateral direction from the furnace outlet into an upper region of the condenser chamber.

* * * * *

UNITED STATES PATENT AND TRADEMARK OFFICE
CERTIFICATE OF CORRECTION

PATENT NO.       : 7,790,099 B2
APPLICATION NO.  : 10/531649
DATED            : September 7, 2010
INVENTOR(S)      : David Wilson and Giuseppe Italiano Page 1 of 1

It is certified that error appears in the above-identified patent and that said Letters Patent is hereby corrected as shown below:

Title Page Item (73), "Assignee" reads as "David Wilson Investments Pty. Ltd.," and should read as "D. Wilson Investments Pty. Ltd., Newport (AU) and Ferro Carbon Technology Pty. Ltd., Claufield (AU)"

Title Page Item (86), the filing date reads as "§371 (c)(1), (2), (4) Date: October 11, 2005" and should read as "§371 (c)(1), (2), (4) Date: April 15, 2005"

Signed and Sealed this

Thirteenth Day of September, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,790,099 B2 | Page 1 of 1 |
| APPLICATION NO. | : 10/531649 | |
| DATED | : September 7, 2010 | |
| INVENTOR(S) | : David Wilson and Giuseppe Italiano | |

It is certified that error appears in the above-identified patent and that said Letters Patent is hereby corrected as shown below:

Title Page Item (73), "Assignee" reads as "David Wilson Investments Pty. Ltd.," and should read as "D. Wilson Investments Pty. Ltd., Newport (AU) and Ferro Carbon Technology Pty. Ltd., Caulfield (AU)"

Title Page Item (86), the filing date reads as "§371 (c)(1), (2), (4) Date: October 11, 2005" and should read as "§371 (c)(1), (2), (4) Date: April 15, 2005"

This certificate supersedes the Certificate of Correction issued September 13, 2011.

Signed and Sealed this
Eighteenth Day of October, 2011

David J. Kappos
*Director of the United States Patent and Trademark Office*